: (12) United States Patent
Nishiwaki

(10) Patent No.: US 8,253,828 B2
(45) Date of Patent: Aug. 28, 2012

(54) IMAGE CAPTURE DEVICE INCLUDING EDGE DIRECTION DETERMINATION UNIT, AND IMAGE PROCESSING METHOD FOR THE SAME

(75) Inventor: Katsuhiro Nishiwaki, Chita-gun (JP)

(73) Assignee: Elmo Company, Limited (JP)

( * ) Notice: Subject to any disclaimer, the term of this patent is extended or adjusted under 35 U.S.C. 154(b) by 477 days.

(21) Appl. No.: 12/511,696

(22) Filed: Jul. 29, 2009

(65) Prior Publication Data

US 2010/0026862 A1 Feb. 4, 2010

(30) Foreign Application Priority Data

Jul. 31, 2008 (JP) ................................. 2008-197799

(51) Int. Cl.
*H04N 9/64* (2006.01)
(52) U.S. Cl. .................................... 348/246; 348/222.1
(58) Field of Classification Search ............... 348/222.1, 348/241, 246
See application file for complete search history.

(56) References Cited

U.S. PATENT DOCUMENTS

| 7,015,961 | B2* | 3/2006 | Kakarala | 348/246 |
| 2005/0030395 | A1* | 2/2005 | Hattori | 348/246 |
| 2005/0219390 | A1* | 10/2005 | Tajima et al. | 348/246 |
| 2006/0238629 | A1* | 10/2006 | Sato et al. | 348/241 |
| 2007/0009172 | A1* | 1/2007 | Wu | 348/246 |

FOREIGN PATENT DOCUMENTS

| JP | 2001-086517 A | 3/2001 |
| JP | 2002-344814 A | 11/2002 |

* cited by examiner

*Primary Examiner* — Gevell Selby
(74) *Attorney, Agent, or Firm* — Ostrolenk Faber LLP

(57) ABSTRACT

The image capture device includes pixel data acquisition unit for acquiring pixel data of a pixel of interest and neighboring pixels from an image capture element; an edge direction determination unit for determining whether a pattern such as an edge is defined by neighboring pixels centered on the pixel of interest; correction unit; and color interpolation unit. When a pixel of interest is determined by a defective pixel determination unit to be a defective pixel, and is moreover determined by the edge direction determination unit not to lie in an edge direction, the correction unit will correct the pixel of interest to a correction value derived from pixel data of neighboring pixels in a symmetrical array centered thereon. For a pixel of interest that has not been corrected, color interpolation according to the direction the edge will be carried out by the color interpolation unit, using the determination outcome of the edge direction determination unit.

16 Claims, 13 Drawing Sheets

Fig.4(A)

Defect determination process/green (G)

| G00 | R01 | G02 | R03 | G04 |
|-----|-----|-----|-----|-----|
| B10 | G11 | B12 | G13 | B14 |
| G20 | R21 | G22 | R23 | G24 |
| B30 | G31 | B32 | G33 | B34 |
| G40 | R41 | G42 | R43 | G44 |

Fig.4(B)

Defect determination process/red (R)

| R01 | G02 | R03 | G04 | R05 |
|-----|-----|-----|-----|-----|
| G11 | B12 | G13 | B14 | G15 |
| R21 | G22 | R23 | G24 | R25 |
| G31 | B32 | G33 | B34 | G35 |
| R41 | G42 | R43 | G44 | R45 |

Fig.6

Correction value creation process/green (G)

| G00 | R01 | G02 | R03 | G04 |
|-----|-----|-----|-----|-----|
| B10 | G11 | B12 | G13 | B14 |
| G20 | R21 | G22 | R23 | G24 |
| B30 | G31 | B32 | G33 | B34 |
| G40 | R41 | G42 | R43 | G44 |

Fig.7(A)

High-frequency component extraction process/green (G)

| G00 | R01 | G02 | R03 | G04 |
|-----|-----|-----|-----|-----|
| B10 | G11 | B12 | G13 | B14 |
| G20 | R21 | G22 | R23 | G24 |
| B30 | G31 | B32 | G33 | B34 |
| G40 | R41 | G42 | R43 | G44 |

G22h ; Green high-frequency component

G22h=[(G22*13)
    −(G00+G02+G04
    +G11+G13
      +G20+G22+G24
      +G31+G33
        +G40+G42+G44)]/13       ··· Expression (1)

Fig.7(B)

High-frequency component extraction process/green (G)

| R01 | G02 | R03 | G04 | R05 |
|-----|-----|-----|-----|-----|
| G11 | B12 | G13 | B14 | G15 |
| R21 | G22 | R23 | G24 | R25 |
| G31 | B32 | G33 | B34 | G35 |
| R41 | G42 | R43 | G44 | R45 |

R23h; Red high-frequency component extraction process/red (R)

R23h=[(R23*9)
    −(R01+R03+R05
    +R21+R23+R25
      +R41+R43+R45)]/9       ···Expression (2)

Fig.8

Edge direction determination process/red (R)

| B00 | G01 | B02 | G03 | B04 | G05 | B06 |
|-----|-----|-----|-----|-----|-----|-----|
| G10 | R11 | G12 | R13 | G14 | R15 | G16 |
| B20 | G21 | B22 | G23 | B24 | G25 | B26 |
| G30 | R31 | G32 | R33 | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

Fig.9

| B22 |     | B24 |
|-----|-----|-----|
|     | R33 |     |
| B42 |     | B44 |

Fig.10(A)

Red (R) vertical determination process

| G12 | R13 | G14 |
|-----|-----|-----|
|     | G23 |     |
| G32 | R33 | G34 |
|     | G43 |     |
| G52 | R53 | G54 |

R33v ···Vertical determination value $$R33v = |G23-G43| \\ + |R33-R13| + |R33-R53| \\ + |G32-G12| + |G32-G52| \\ + |G34-G14| + |G34-G54|$$

···Expression (3)

Fig.10(B)

Red (R) horizontal determination process

| G21 |     | G23 |     | G25 |
|-----|-----|-----|-----|-----|
| R31 | G32 | R33 | G34 | R35 |
| G41 |     | G43 |     | G45 |

R33h ···Horizontal determination value $$R33h = |G32-G34| \\ + |R33-R31| + |R33-R35| \\ + |G23-G21| + |G23-G25| \\ + |G43-G41| + |G43-G45|$$

··· Expression (4)

Red (R) positive-slope diagonal determination process

R33ru ···Positive-slope diagonal determination value $R33ru = |B42-B24|$
$+ |R33-R15| + |R33-R51|$
$+ |G23-G41| + |G32-G14|$
$+ |G34-G52| + |G43-G25|$ ··· Expression (5)

Red (R) negative-slope diagonal determination process

R33rd ···Negative-slope diagonal determination value $R33rd = |B22-B44|$
$+ |R33-R11| + |R33-R55|$
$+ |G23-G45| + |G34-G12|$
$+ |G32-G54| + |G43-G21|$ ··· Expression (6)

Color interpolation process

Fig.13(A)
Vertical determination

|  | G93 |  |  |  |
|---|---|---|---|---|
| R01 | G02 | R03 | G04 | R05 |
| G11 | B12 | G13 | B14 | G15 |
| R21 | G22 | R23 | G24 | R25 |
| G31 | B32 | G33 | B34 | G35 |
| R41 | G42 | R43 | G44 | R45 |
|  | G53 |  |  |  |

Fig.13(B)
Horizontal determination

|  | R01 | G02 | R03 | G04 | R05 |  |
|---|---|---|---|---|---|---|
|  | G11 | B12 | G13 | B14 | G15 |  |
| G20 | R21 | G22 | R23 | G24 | R25 | G26 |
|  | G31 | B32 | G33 | B34 | G35 |  |
|  | R41 | G42 | R43 | G44 | R45 |  |

Fig.13(C)
Diagonal/other determination

| R01 | G02 | R03 | G04 | R05 |
|---|---|---|---|---|
| G11 | B12 | G13 | B14 | G15 |
| R21 | G22 | R23 | G24 | R25 |
| G31 | B32 | G33 | B34 | G35 |
| R41 | G42 | R43 | G44 | R45 |

Edge stabilization process

Fig.14(A)
Vertical determination

| G01 | G02 | G03 | G04 | G05 |
|---|---|---|---|---|
| G11 | G12 | G13 | G14 | G15 |
| G21 | G22 | G23 | G24 | G25 |
| G31 | G32 | G33 | G34 | G35 |
| G41 | G42 | G43 | G44 | G45 |

Fig.14(B)
Horizontal determination

| G01 | G02 | G03 | G04 | G05 |
|---|---|---|---|---|
| G11 | G12 | G13 | G14 | G15 |
| G21 | G22 | G23 | G24 | G25 |
| G31 | G32 | G33 | G34 | G35 |
| G41 | G42 | G43 | G44 | G45 |

Fig.14(C)
Diagonal/other determination

| G01 | G02 | G03 | G04 | G05 |
|---|---|---|---|---|
| G11 | G12 | G13 | G14 | G15 |
| G21 | G22 | G23 | G24 | G25 |
| G31 | G32 | G33 | G34 | G35 |
| G41 | G42 | G43 | G44 | G45 |

IMAGE CAPTURE DEVICE INCLUDING EDGE DIRECTION DETERMINATION UNIT, AND IMAGE PROCESSING METHOD FOR THE SAME

This application claims the benefit of and priority from Japanese Application No. 2008-197799 filed Jul. 31, 2008, the content of which is incorporated herein by reference.

BACKGROUND OF THE INVENTION

1. Field of the Invention

The present invention relates to an image capture device defective pixel detection device adapted to correct defective pixels among a plurality of pixels making up the pixels of an image captured by the image capture device, and which may result for example from improper operation of image capture elements provided to the imaging device.

2. Description of the Related Art

Image capture devices such as digital still cameras and digital video cameras have come to enjoy widespread use in recent years. Such image capture devices employ image capture elements that are adapted to convert light received via a lens into an electrical signal. CCD (Charge Coupled Device), CMOS (Complementary Metal Oxide Semiconductor) sensors, and the like are commonly used image capture elements of this kind. Such image capture elements are furnished with a plurality of photodetector elements (photodiodes) corresponding to the plurality of pixels that make up the photographed image, and are adapted to output image data that represents a respective pixel value of each pixel. When an image taken by an image capture device is displayed on a display device, if for example any of the photodetector elements should experience improper operation during shooting, resulting in output of pixel data of a higher value than the correct value for output, the pixel corresponding to the photodetector element in question may appear as a so-called bright defect, whereas if pixel data of a lower value than the correct value for output is output, the pixel corresponding to the photodetector element in question may appear as a so-called dark defect.

Various technologies have been proposed in the past for use in image capture devices, for the purpose of detecting defective pixels caused for example by improper operation of an image capture elements among a plurality of pixels making up the pixels of an image captured by the device. For example, Patent Citation 1 (JP-A 2001-86517) discloses technology whereby in the event that a bright defect which constitutes a pixel defect is detected in a single-plate type color video camera, a check is made to ascertain, from the frequency characteristics of a neighboring pixel having a different color filter from the color of the pixel under examination, that the examined pixel does not have a high-frequency component; then, if it is detected that the examined pixel has a high-frequency component, designating the pixel to have a defect.

Patent Citation 2 (JP-A 2002-344814) discloses technology whereby during shooting, pixel blocks composed of nine (3×3) pixels centered on a pixel of interest are sequentially accumulated in a buffer; the values of the pixel of interest and its neighboring pixels are compared while counting the number Hn of neighboring pixels with higher values than the pixel of interest and the number Ln of neighboring pixels with lower values than the pixel of interest; and in the event that the number Hn of neighboring pixels with higher values than the pixel of interest is five or more, determining that a dark defect has occurred, and outputting the pixel of interest after first replacing its value with the average value of the neighboring pixels having higher values; or in the event that the number Ln of neighboring pixels with lower values than the pixel of interest is five or more, determining that a bright defect has occurred, and outputting the pixel of interest after first replacing its value with the average value of the neighboring pixels having lower values.

However, the technologies taught in the above Patent Citations 1 and 2 have the problem that if a defective pixel is located within a pattern of a subject having minimal color variation, the defect produced thereby will be particularly noticeable. In such cases, lowering the threshold value so as to be able to detect more defective pixels will create the problem of degrading the picture quality of high-definition patterns that include edges.

SUMMARY

An advantage of some aspects of the invention is provided with an image capture device able to reduce defects occurring in patterns with minimal color variation, as well as to sharply display high-definition patterns that include edges and the like.

According to an aspect of the invention, the invention provides an image capture device according to the first mode is adapted to detect and correct defective pixels from among a plurality of pixels making up an image captured by the image capture unit. Specifically, the pixel data acquisition unit sequentially acquires pixel data that represents a pixel value of a pixel of interest targeted for the defective pixel detection, and pixel data that represents pixel values of a plurality of neighboring pixels situated neighboring the pixel of interest, and inputs the data to edge direction determination unit and the correction unit. In the edge direction determination unit, using the high-frequency component of the pixel of interest which has been derived on the basis of differential between the pixel data of the pixel of interest and the pixel data of the neighboring pixels, it is determined whether the pixel of interest, together with neighboring pixels, defines an edge pattern of a subject in any direction. Meanwhile, in the correction unit, there is provided a defective pixel determination unit adapted to determine a defective pixel based on pixel data from the pixel data acquisition unit, and when a pixel of interest has been determined by the defective pixel determination unit to be a defective pixel, and moreover the pixel of interest has been determined by the edge direction determination unit to not lie in an edge direction, the pixel of interest will be corrected to a correction value which is derived from pixel data of neighboring pixels in a symmetrical array centered thereon. The color interpolation unit will use pixel data differing in color from the pixel of interest and arrayed in the direction of an edge as determined on the basis of the edge determination by the edge direction determination unit, to create different color from the pixel of interest at locations of pixels of interest that have been by the correction unit and of pixels of interest that have not been so corrected.

The image capture device according to the first mode uses pixel data for a pixel of interest and neighboring pixels in order for the edge direction determination unit to determine an edge direction of a subject; and based on the outcome of this determination, a different process will be carried out in relation to correction in instances where the pixel of interest is a defective pixel. Specifically, in areas lacking specificity of edge direction of the subject, i.e. areas of a pattern lacking an edge and having minimal color variation, a defective pixel can be detected more reliably by using data of neighboring pixels centered symmetrically about the pixel of interest and by employing a smaller threshold value for determining defective pixels; and on the basis of this detection outcome, appropriate correction can be made to a defective pixel that tends to stand out particularly against a uniform pattern. On the other hand, in areas in which there is specificity of edge direction of a subject, i.e. areas of a pattern in which an edge is present and having considerable color variation, if correction were performed by the correction unit discussed above, defective pixel determinations would become too numerous, resulting in degraded picture quality. According to the present invention, however, because processing of the pixel of interest through color interpolation will be carried out on the basis of the determination outcome by the edge direction determination unit in a manner irrespective of the defective pixel determination, even if a defective pixel happens to be present in an edge section, it will be possible nevertheless to obtain an image having a sharp edge, while making full use of the pixel data of the pixel of interest.

According to a second mode, the high-frequency component is derived from the differential between the sum of neighboring pixels of identical color to the pixel data of the pixel of interest, and a value obtained by multiplying the pixel data of the pixel of interest by the number of neighboring pixels.

According to a third mode, the defective pixel determination unit derives determination pixel groups containing pixel data of the pixel of interest and neighboring pixels arranged in order from larger pixel values thereof; and when the pixel value of the pixel of interest lies within a prescribed high or low range in the determination pixel group, will determine that the pixel of interest is a defective pixel. Through this arrangement, defective pixels can be reliably detected even in the case of a succession of defective pixels equal in number to that of the determination pixel groups.

According to a fourth mode, the defective pixel determination unit will decide that the pixel of interest is the defective pixel when the pixel value thereof is greater by a prescribed threshold value than the median value of the determination pixel group.

According to a fifth mode, the correction value of the correction unit is derived from an average value of pixel values obtained by arranging the pixel values of the pixel of interest and neighboring pixels in order from larger pixel values thereof, and excluding high and low range pixel values.

According to a sixth mode, the edge direction determination unit determines edge direction on the basis of pixel data taken from pixel data of neighboring pixels centered on the pixel of interest and lying in the vertical direction, pixel data in the horizontal direction, or pixel data in a diagonal direction, wherein the pixel data is different in color than the pixel of interest.

According to a seventh mode, the edge direction determination unit determines respective absolute values of pixel data differential in the vertical direction, horizontal direction, or diagonal direction, and designates as an edge direction a direction for which the absolute value is equal to or greater than a prescribed value and represents the smallest direction value.

According to an eighth mode, the color interpolation unit derives pixel values from average value of pixel values obtained by arranging neighboring pixels that have been lined up in the edge direction, doing so in order from larger pixel values thereof and excluding high and low range pixel values.

In the present modes, CCDs and CMOS sensors may be given by way of examples of image capture elements. In the image capture elements, the photodetectors may be arrayed in a matrix arrangement, or arrayed in a honeycomb arrangement.

Besides the defective pixel detection device and image capture device mentioned above, the present invention may also be embodied as a defective pixel detection method invention. Various other possible embodiments include a computer program for implementing the same; a recording medium having such a program recorded thereon; or a data signal containing the program and carried on a carrier wave. It is possible for the various supplemental elements mentioned previously to be implemented in these respective embodiments as well.

Where the present invention is embodied as a computer program or a recording medium having such a program recorded thereon, it may take the form of an entire program for controlling operations of the defective pixel detection device or the image capture device, or constitute only those units for accomplishing the functions of the present invention. Examples of recording media are flexible disks, CD-ROM, DVD-ROM, magneto-optical disks, IC cards, ROM cartridges, punch cards, printed matter imprinted with bar codes or other symbols, computer internal storage devices (memory such as RAM and ROM) and external storage devices, and other such computer-readable media.

These and other objects, features, aspects, and advantages of the present invention will become more apparent from the following detailed description of the preferred embodiments with the accompanying drawings.

BRIEF DESCRIPTION OF THE DRAWINGS

FIGS. 4(A) and 4(B) show a defect determination process that is processed by the defective pixel determination unit.

FIG. 6 shows a correction value creation process created by a correction value creation unit, FIGS. 7(A) and 7(B) show a high-frequency component extraction process that is processed by a high-frequency component extraction unit, FIG. 8 shows an edge direction determination process that is processed by an edge direction determination process unit, FIG. 9 shows an edge direction determination process that is processed by the edge direction determination process unit, FIGS. 10(A) and 10(B) show vertical and horizontal determinations by the edge direction determination process unit, FIGS. 13(A), 13(B) and 13(C) show a green interpolation process that is processed by a green interpolation unit, and FIGS. 14(A), 14(B) and 14(C) show an edge stabilization process that is processed by an edge stabilization unit.

DESCRIPTION OF THE PREFERRED EMBODIMENTS (1) Configuration of Image Capture Device FIG. 1 is an illustration depicting a schematic configuration of an image capture device 100 according to one embodiment of the present invention. The image capture device 100 includes an image capture unit 10, a defective pixel detection/correction unit 20, and an output unit (not shown); as will be discussed later, the device is adapted to successively perform detection, correction, and interpolation for defective pixels (so-called bright and dark defects) among the plurality of pixels making up an image captured by the image capture unit 10, and to then output corrected pixel values. In the present embodiment, the defective pixel detection/correction unit 20 and the output unit are constituted by hardware. However, units of these could instead be constituted by software. While not illustrated in the drawing, the image capture device 100 will also be provided with a display unit such as a liquid crystal panel for displaying captured images; and with a recording unit for saving captured images to a recording medium such as a flash memory. The image capture device 100 also has a CPU, RAM, ROM and the like, and is equipped with a control unit (not shown) for controlling the various parts of the image capture device 100.

The image capture unit 10 is furnished with a zoom lens, a focus lens, and an aperture (not shown); an image capture element 12 for converting light received via these components into an electrical signal; and pixel data acquisition unit 14 for temporarily holding the picture signal output by the image capture element 12. The image capture element 12 is equipped with a plurality of photodetector elements (photo diodes) respectively provided in correspondence with the plurality of pixels that make up the captured images, and is adapted to respectively output pixel data representing a pixel value of the corresponding pixel.

Figure 2:
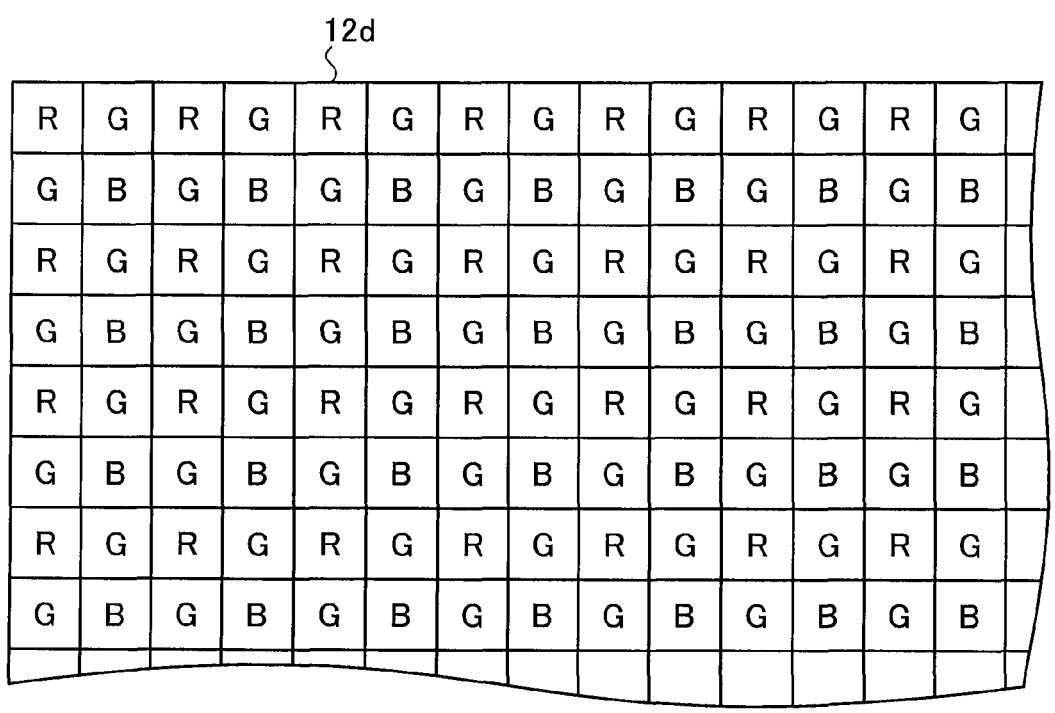
FIG. 2 shows an array of photodetector elements in an image capture element.

FIG. 2 is an illustration depicting an array of photodetector elements 12d in the image capture element 12. The image capture device 100 of the present embodiment is an image capture device of so-called single-plate type furnished with a single image capture element 12. In the image capture element 12, the plurality of photodetector elements 12d are arrayed in a matrix pattern. In the image capture element 12, the plurality of photodetector elements 12d could be arrayed in a honeycomb pattern instead. The photodetector elements 12d are respectively provided with color filters. In the present embodiment, the photodetector elements 12d are provided with color filters of the primary color system, namely, red (R), green (G), and blue (B) color filters in the illustrated arrangement. The photodetector elements 12d could also provided with color filters of the complementary color system, i.e. cyan, magenta, and yellow color filters, disposed in a prescribed arrangement. The number of photodetector elements 12d in the image capture element 12 may be established optionally according to the required optical resolution.

Figure 1:
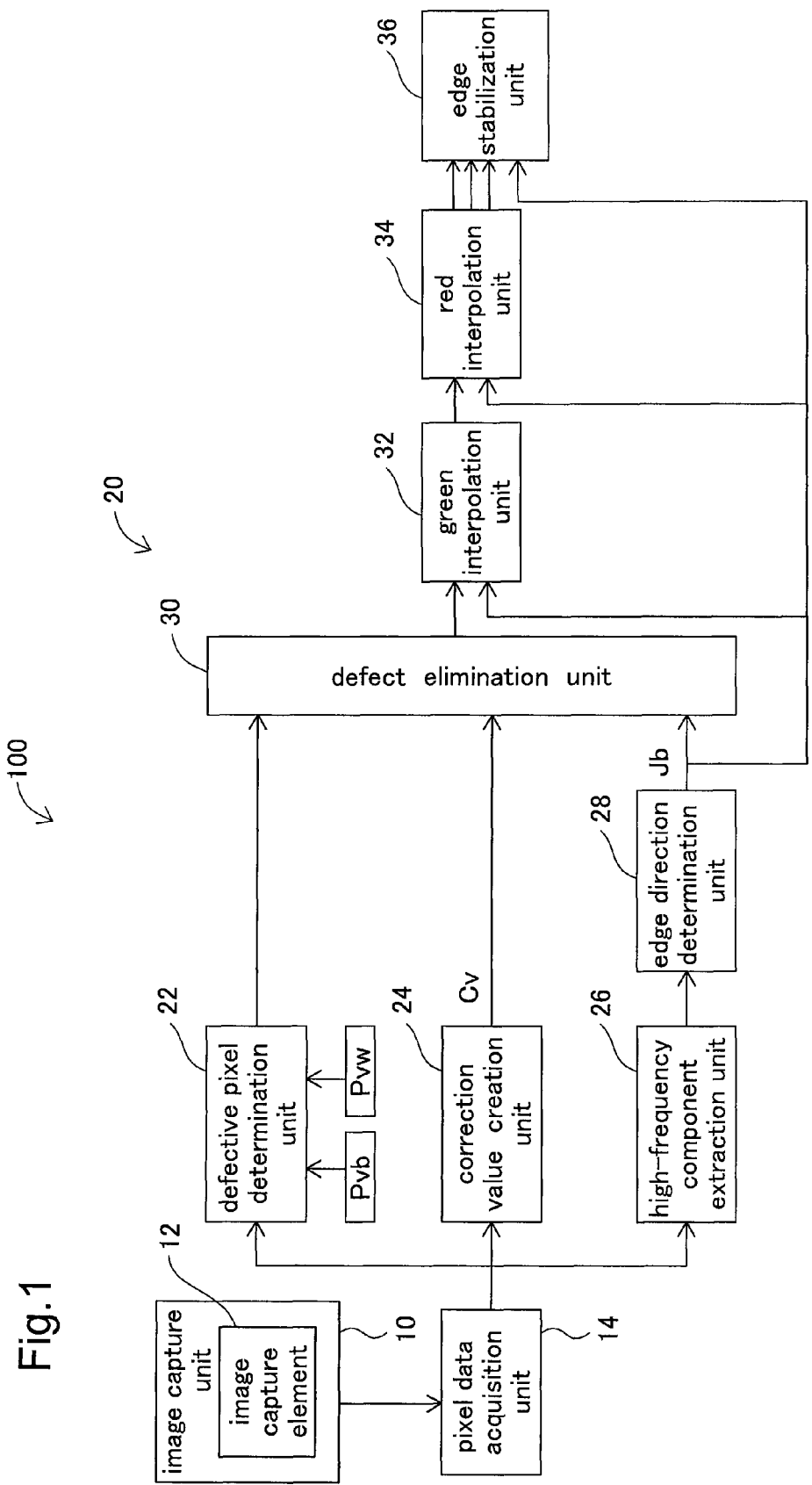
FIG. 1 shows a schematic configuration of an image capture device according to one embodiment of the present invention.

The defective pixel detection/correction unit 20 depicted in FIG. 1 is furnished with a defective pixel determination unit 22, a correction value creation unit 24, a high-frequency component extraction unit 26, an edge direction determination unit 28, a defect elimination unit 30, a green interpolation unit 32, a red interpolation unit 34, and an edge stabilization unit 36; it is adapted to detect and correct defective pixels among the plurality of pixels that make up an image captured by the image capture unit 10, as well as to carry out an interpolation process for creating pixel data of color not corresponding to any of the color filters, from pixel data of other colors. The edge stabilization unit 36 outputs the signal that outputs and an imaging processing unit (not shown in FIG. 1).

The functions of the various parts of the defective pixel detection/correction unit 20 will be described below.

(2) Configuration and Function of Parts of the Defective Pixel Detection/Correction Portion 20

Figure 3:
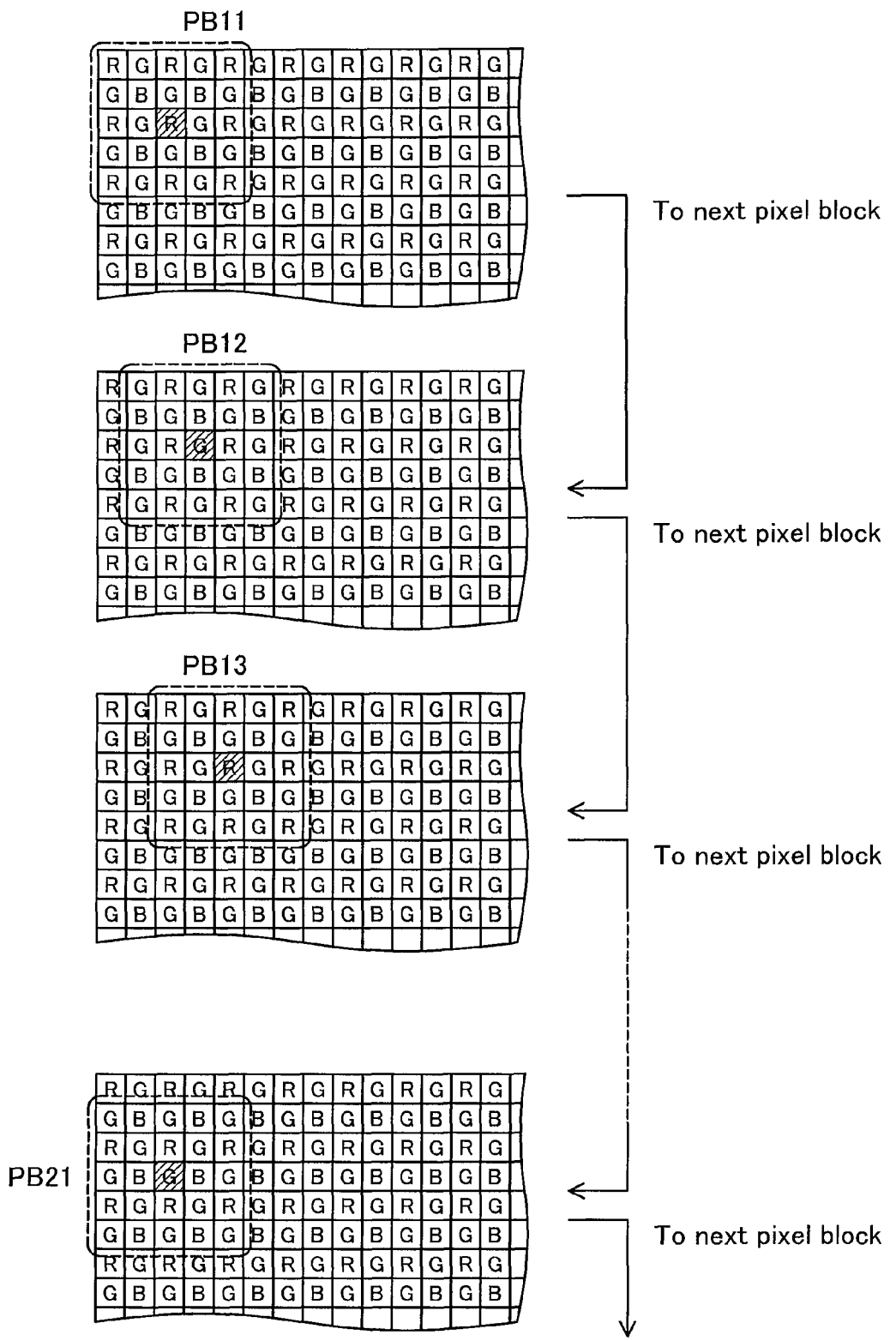
FIG. 3 shows in model form a scheme of the flow of processes by a defective pixel detection/correction unit.

FIG. 3 is an illustration depicting in model form the scheme of the flow of processes by the defective pixel detection/correction unit 20. In the present embodiment, pixel data of pixel blocks PBij of prescribed area shown by the broken lines in the drawing and composed for example of 5×5 pixels are respectively acquired from among the plurality of pixels that make up the captured image (in the pixel blocks PBij, i denotes the i-th pixel moving downward from top left of the pixel, and j denotes the j-th pixel moving rightward from top left of the image); then, on the basis of the pixel values of neighboring pixels that neighbor a pixel of interest (a pixel targeted for defective pixel detection), it will be determined whether the pixel of interest is a pixel that would be readily visible as a defective pixel, and then correction and interpolation thereof will be performed based on pixel data of the neighboring pixels. As shown in FIG. 3, these processes will be carried out in the order pixel block PB11—pixel block PB12—pixel block PB13— . . . —pixel block PB21— . . . until reaching the final pixel block, namely, the final pixel of interest.

(2)-1 Defective Pixel Determination Portion 22

Figure 5:
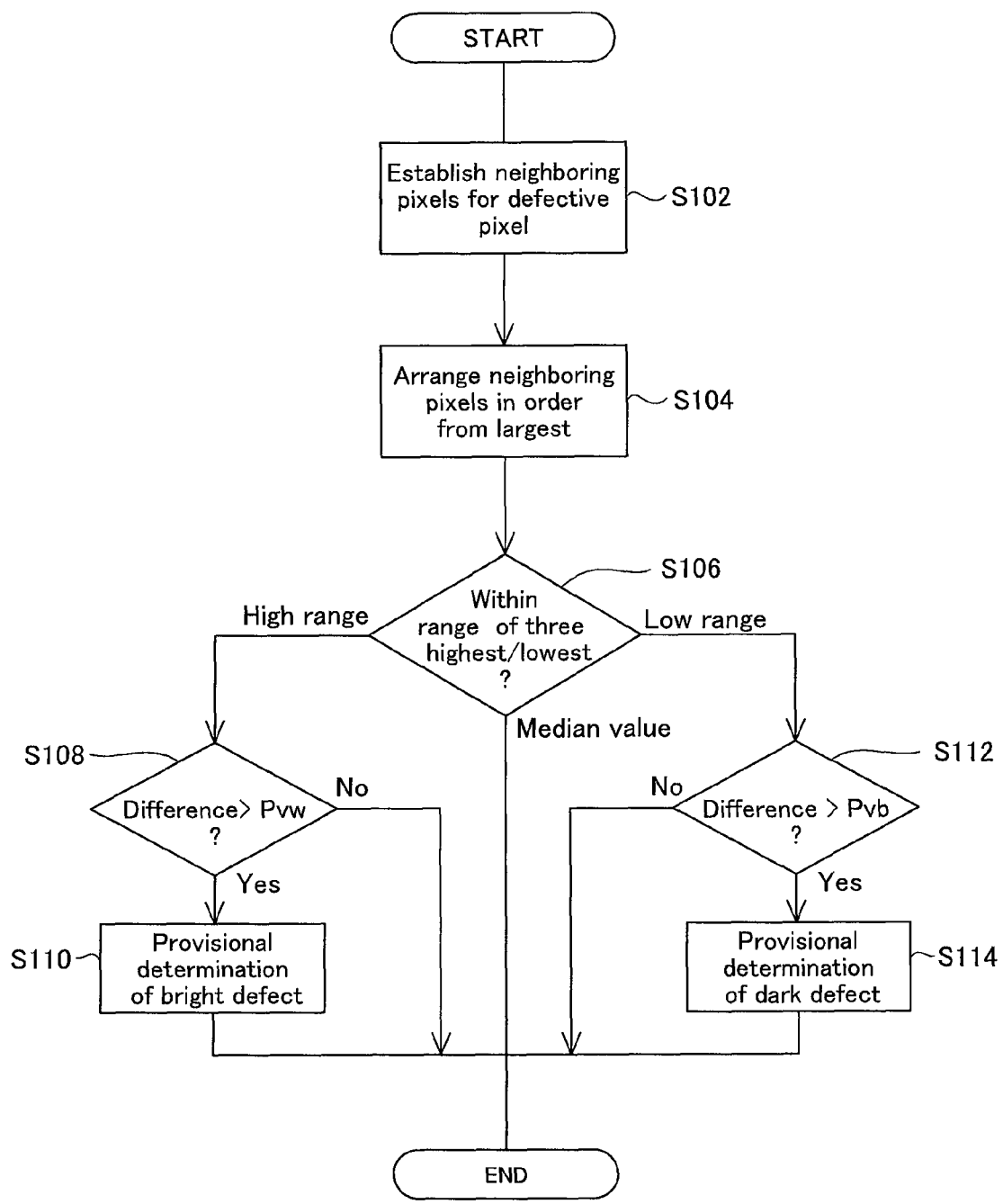
FIG. 5 shows the defect determination process.

FIG. 4 is an illustration depicting a defect determination process that is processed by the defective pixel determination unit 22; and FIG. 5 is a flowchart illustrating the defect determination process. First, the defective pixel determination unit 22 will select pixel data points neighboring a pixel of interest that has been established by the pixel data acquisition unit 14, and will establish these data points as neighboring pixels for use in determining whether the pixel of interest is a defective pixel. Specifically, as shown in (A) in FIG. 4, if the pixel of interest is a green pixel G22, nine neighboring pixels G02, G11, G13, G20, G22, G24, G31, G33, and G42 which are indicated by diagonal lines will be established as the pixel data for use in the defective pixel determination (Step S102). Next, the nine pixel data points will be arranged in order from larger values (Step S104), and it will be determined whether the pixel of interest G22 falls within the range of the three highest or three lowest values (Step S106). Here, if the pixel data of the pixel of interest has been determined to lie within a range equal to or greater than the third highest value, the absolute value of the difference between the pixel data of the pixel of interest and that of the fifth largest pixel (the median value) will be derived; it will then be determined whether this absolute value of the difference is greater than a bright defect threshold value Pvw (Step S108), and in the event of an affirmative decision, the pixel of interest will be provisionally designated as a bright defect (Step S110). If on the other hand the pixel data of the pixel of interest lies within the range equal to or less than the third lowest value, the absolute value of the difference between the pixel data of the pixel of interest and the median value will be derived; it will then be determined whether this absolute value of the difference is greater than a dark defect threshold value Pvb (Step S112), and in the event of an affirmative decision, the pixel of interest will be provisionally designated as a dark defect (Step S114). If on the other hand provisional determination of a defect fails to be made, the pixel data of the pixel of interest will be sent in unmodified form to the subsequent stage.

That is, in the defect determination process, if the pixel data of a pixel of interest falls within the range of the three highest or three lowest pixel data points of the pixel data used for the defective pixel determination, and is also greater than the median value by a prescribed value or more, the pixel will be provisionally determined to be a bright or dark defect. The reason for employing the three highest and three lowest pixel data points as pixels for the defective pixel determination is so as to be able to deal with instances in which there might be three successive defects.

On the other hand, as depicted in (B) in FIG. 4, if the pixel of interest is red pixel data R23, an analogous defect determination process will be carried out by setting the nine neighboring pixels R01, R03, R05, R21, R25, R41, R43, and R45 indicated by diagonal lines as neighboring pixels for use in the defective pixel determination. The process for a blue pixel of interest will be analogous to that for red.

(2)-2 Correction Value Creation Portion 24

FIG. 6 is an illustration depicting a correction value creation process created by the correction value creation unit 24. When a pixel of interest has been provisionally determined by the defective pixel determination unit 22 to be a defect, the correction value creation unit 24 will establish a correction value for the defective pixel. As shown in FIG. 6, if the pixel of interest is a green pixel G22, a defect correction value Cv will be derived using the pixel data of the nine neighboring pixels selected from the pixel block of 5×5 pixels and indicated by the diagonal lines, by taking the average value of five pixel data points that are symmetrically centered about the pixel of interest, and from which the two highest and two lowest values have been excluded.

(2)-3 High-frequency Component Extraction Portion 26

FIG. 7 is an illustration depicting a high-frequency component extraction process that is processed by the high-frequency component extraction unit 26. The high-frequency component extraction unit 26 creates pixel data in which high-frequency components (edge components) for individual pixels are emphasized. Specifically, in (A) of FIG. 7, in the instance where the pixel data of the green pixel G22 is the pixel of interest, thirteen green pixel data points indicated by hatching will be acquired from a pixel block of 5×5 pixels centered on the pixel of interest. Then, as indicated by Expression (1) in FIG. 7 (A), the sum of pixel data of thirteen neighboring pixels will be subtracted from a value obtained by multiplying the number of neighboring pixels (i.e. 13) by the pixel data of the green pixel of interest G22, and the result will be divided by the neighboring pixel count (i.e. 13) to arrive at a value for pixel data $G22h$ of the high-frequency components of the green pixel G22. That is, the pixel data $G22h$ signifies a green pixel G22 value that extracts sections of different output from neighboring pixels.

Analogously, as shown in (B) in FIG. 7, in an instance where the pixel data of the red pixel data R23 is the pixel of interest, the nine red pixel data points indicated by hatching will be acquired from a pixel block of 5×5 pixels centered on the pixel of interest. Then, as indicated by Expression (2) in FIG. 7 (B), the sum of the pixel data of the neighboring pixels will be subtracted from a value obtained by multiplying the number of neighboring pixels (i.e. 9) by the pixel data of the pixel of interest, and the result will be divided by the neighboring pixel count (i.e. 9) to arrive at data $R23h$ of the high-frequency components of the red pixel data R23. Where the pixel of interest is blue pixel data, the process will be analogous to that for red pixel data. The pixel data from which the high-frequency components have been extracted will be sent to the edge direction determination unit 28 in the subsequent stage.

(2)-4 Edge Direction Determination Portion 28

FIG. 8 is an illustration depicting an edge direction determination process that is processed by the edge direction determination process unit 28. On the basis of the pixel data $G22h$ etc. of emphasized edge components created by the high-frequency component extraction unit 26 and shown in FIG. 7, the edge direction determination unit 28 will carry out a determination as to whether the pixel of interest, together with neighboring pixels, constitutes a high-definition pattern that includes an edge lying in the vertical, horizontal, or a diagonal direction, or whether they are isolated points. In FIG. 8, the process is calculated on the basis of pixel data of pixel blocks composed of 7×7 pixels. Here, as shown in FIG. 9, in an instance where the pixel of interest is red pixel data R33, edge direction determination processes (discussed below) will be respectively carried out for five pixel data points that are centered on the red pixel data R33, and where all of these processes yield identical determinations, the red pixel of interest R33 will be determined to constitute an edge lying in either the vertical, horizontal, positive-slope diagonal, or negative-slope diagonal direction. First, each determination process for the red pixel of interest R23 will be described; however, these determination processes will be carried out analogously for neighboring pixels of the red pixel data R23, namely, blue B24, blue B42, and blue B44.

(a) Vertical Determination Value Calculation Process

In FIG. 10, (A) is an illustration depicting a vertical determination value calculation process for the red pixel data R33. The vertical determination for the red pixel data R33 is carried out by deriving a vertical determination value $R33v$ using Expression (3) shown in FIG. 10 (A). Specifically, absolute values of the difference between pairs of pixel values of neighboring pixels centered on the red pixel of interest R33 and lying in the vertical direction are derived, and the sum of these is then calculated.

(b) Horizontal Determination Value Calculation Process

In FIG. 10, (B) is an illustration depicting a horizontal determination value calculation process for the red pixel data R33. The horizontal determination for the red pixel data R33 is carried out by deriving a vertical determination value $R33h$ using Expression (4) shown in FIG. 10 (B). Specifically, absolute values of the difference between pairs of pixel values of neighboring pixels centered on the red pixel of interest R33 and lying in the horizontal direction are derived, and the sum of these is then calculated.

(c) Positive-slope Diagonal Determination Value Calculation Process

Figure 11A:
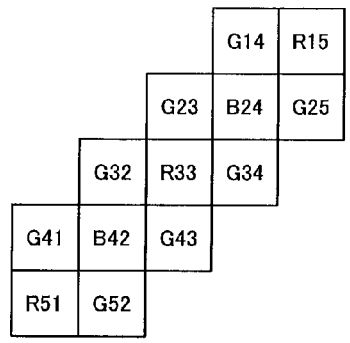
FIGS. 11(A) and 11(B) show diagonal determinations by the edge direction determination process unit.
Figure 11B:
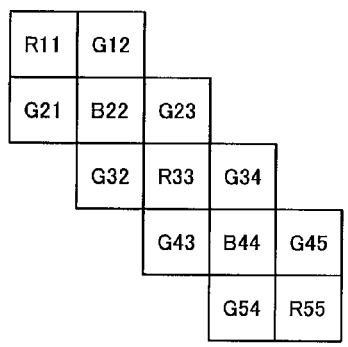

In FIG. 11, (A) is an illustration depicting a positive-slope diagonal determination value calculation process for the red pixel data R23. This process involves deriving a positive-slope diagonal determination value $R33ru$ for the red pixel of interest R33 from Expression (5) shown in FIG. 11 (A). Specifically, absolute values of the difference between pairs of pixel values of neighboring pixels centered on the pixel of interest red R33 and lying in a positive-slope diagonal direction are derived, and the sum of these is then calculated.

(d) Negative-Slope Diagonal Determination Value Calculation Process

In FIG. 11, (B) is an illustration depicting a negative-slope diagonal determination value calculation process for the red pixel data R23. This process involves deriving a positive-slope diagonal determination value $R33rd$ for the red pixel of interest R33 from Expression (6) shown in FIG. 11 (B). Specifically, absolute values of the difference between pairs of pixel values of neighboring pixels centered on the red pixel of interest R33 and lying in a negative-slope diagonal direction are derived, and the sum of these is then calculated.

(e) Direction Determination Process

Figure 12:
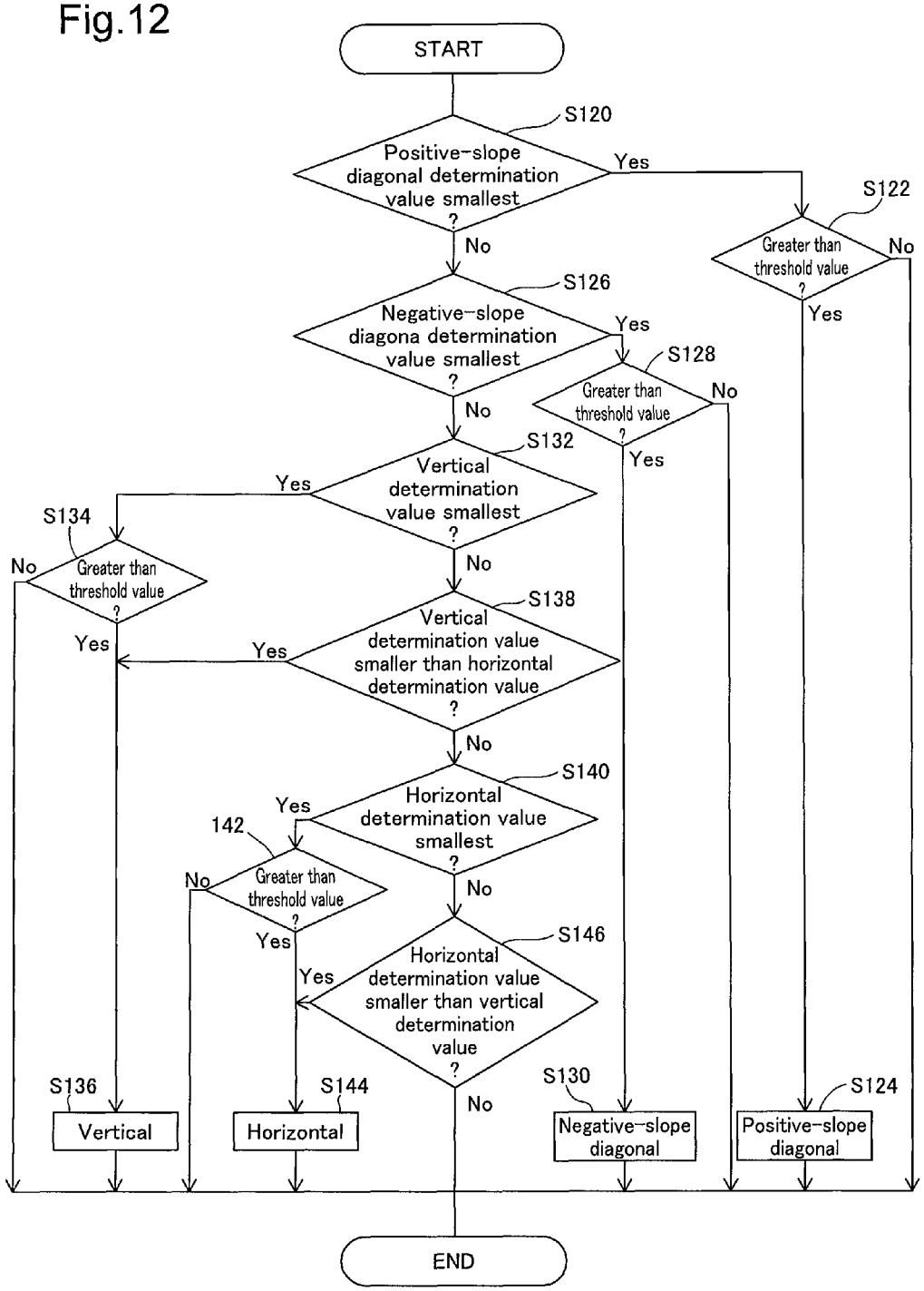
FIG. 12 is a flowchart illustrating the edge direction determination process.

FIG. 12 is a flowchart illustrating the edge direction determination process. In FIG. 12, the edge direction determination process is carried out on the basis of the determination values that were described in FIGS. 10 and 11.

(e)-1 Positive-slope Diagonal Determination

In Step S120, the four determination values that were derived for the red pixel of interest R33, namely, the vertical determination value R33$v$, the horizontal determination value R33$h$, the positive-slope diagonal determination value R33$ru$, and the negative-slope diagonal determination value R33$rd$, are compared. If as a result of the comparison the positive-slope diagonal determination value R33$ru$ is found to be smaller than the other determination values, and moreover in Step S122 the difference from the negative-slope diagonal determination value R33$rd$ is found to be greater than a prescribed threshold value, a positively sloped diagonal edge will be determined (Step S124). Here, the purpose of the prescribed threshold value is to prevent hysteresis in instances where the determination differs depending on results of diagonal determinations for other pixels, and to reduce screen flicker.

(e)-2 Negative-Slope Diagonal Determination

The negative-slope diagonal determination process takes place analogously to the positive-slope diagonal determination described above. Specifically, in Step S126, the four determination values that were derived for the red pixel of interest R33, namely, the vertical determination value R33$v$, the horizontal determination value R33$h$, the positive-slope diagonal determination value R33$ru$, and the negative-slope diagonal determination value R33$rd$, are compared. If the negative-slope diagonal determination value R33$rd$ is found to be smaller than the other determination values, and moreover in Step S128 the difference from the positive-slope diagonal determination value R33$ru$ is found to be greater than a prescribed threshold value for preventing hysteresis, a negatively sloped diagonal edge will be determined (Step S130).

(e)-3 Vertical Determination

The vertical determination process is carried out in two determination processes. Specifically, in Step S132, the four determination values that were derived for the red pixel of interest R33, namely, the vertical determination value R33$v$, the horizontal determination value R33$h$, the positive-slope diagonal determination value R33$ru$, and the negative-slope diagonal determination value R33$rd$, are compared. If as a result of the comparison the vertical determination value R33$v$ is found to be smaller than the other determination values, and moreover in Step S134 the difference from the horizontal determination value R33$h$ is found to be greater than a prescribed threshold value for preventing hysteresis, a vertical edge will be determined (Step S136).

Additionally, in Step S138, pixel data of four pixels neighboring the red pixel data R33 shown in FIG. 9, namely, a vertical determination value B22$v$ and a horizontal determination value B22$h$ derived for a blue pixel B22, a vertical determination value B24$v$ and a horizontal determination value B24$h$ derived for a blue pixel B24, a vertical determination value B$v$42 and a horizontal determination value B42$h$ derived for a blue pixel B42, and a vertical determination value B44$v$ and a horizontal determination value B44$h$ derived for a blue pixel B44, will be respectively compared. If all of the vertical determination values B22$v$, B24$h$, B42$v$, B44$v$ are smaller than the horizontal determination values B22$h$, B24$h$, B42$h$, B44$h$, a vertical edge will be determined (Step S136).

(e)-4 Horizontal Determination

Like the vertical determination process, the horizontal determination process is carried out in two determination processes. Specifically, in Step S140, the four determination values that were derived for the red pixel of interest R33, namely, the horizontal determination value R33$h$, the vertical determination value R33$v$, the positive-slope diagonal determination value R33$ru$, and the negative-slope diagonal determination value R33$rd$, are compared. If as a result of the comparison the horizontal determination value R33$h$ is found to be smaller than the other determination values, and moreover in Step S142 the difference from the vertical determination value R33$v$ is found to be greater than a prescribed threshold value for preventing hysteresis, a horizontal edge will be determined (Step S144).

Additionally, in Step S146, pixel data of four pixels neighboring the red pixel data R33 shown in FIG. 9, namely, a horizontal determination value B22$h$ and a vertical determination value B22$v$ derived for the blue pixel B22, a horizontal determination value B24$h$ and a vertical determination value B24$v$ derived for the blue pixel B24, a horizontal determination value B42$h$ and a vertical determination value B42$v$ derived for the blue pixel B42, and a horizontal determination value B44$h$ and a vertical determination value B44$v$ derived for the blue pixel B44, will be respectively compared. If as a result of the comparison all of the horizontal determination values are smaller than the vertical determination values, a horizontal edge will be determined (Step S144).

(2)-5 Defect Elimination Portion 30

Based on a provisional determination of defect by the defective pixel determination unit 22, and on the determination outcome in the edge direction determination unit 28, i.e. on the basis of the outcome of the determination as to whether the edge lies in the vertical, horizontal, positive-slope diagonal, or negative-slope diagonal direction, the defect elimination unit 30 shown in FIG. 1 will correct the pixel value of the pixel of interest to the defect correction value Cv that was created by the correction value creation unit 24. Specifically, where provisional determination of a defect has been made and it has been determined that there is no edge in any direction, the pixel value of the pixel of interest will be replaced by the defect correction value Cv, but if instead it has been determined that there is an edge lying in any direction, the uncorrected pixel value will be used. Accordingly, even if it is determined that a pixel of interest contains high-frequency components, if it is additionally determined that the pixel is not an independent point but rather part of an edge that continues in the vertical, horizontal or diagonal direction, correction will not be carried out despite the previous determination that the pixel of interest is defective, so the pixel data of the pixel will be left in unmodified form for processing in the subsequent stage.

(2)-6 Green Interpolation Portion 32

FIG. 13 is an illustration depicting a green interpolation process which is processed by the green interpolation unit 32 (FIG. 1). The green interpolation process is a process by which pixel data of photodetectors 12$d$ lacking a green color filter is used to create green pixel data from pixel data of neighboring pixels. The green interpolation process can take any of three modes depending on the determination outcome by the edge direction determination unit 28. Specifically, in the event of a vertical determination as depicted in (A) of FIG. 13, four green pixel data points G93, G13, G33, G53 lying in the vertical direction will be used to create green pixel data G23 at the location of the red pixel data R23. In the event of a horizontal determination as depicted in (B) of FIG. 13, four green pixel data points G20, G22, G24, G26 lying in the horizontal direction will be used to create green pixel data G23 at the location of the red pixel data R23. In the event of a diagonal or other determination as depicted in (C) of FIG. 13, pixel data from four surrounding green pixel data points G20, G22, G24, G26 will be used to create green pixel data G23 at the location of the red pixel data R23. In each of these three modes, the green pixel data G23 will be derived from the average of two intermediate pixel data points, the two points having been obtained by excluding the largest value and the smallest value from the four green pixel data points.

(2)-7 Red Interpolation Portion 34

The red interpolation unit 34 (FIG. 1) performs a process similar to that of the green interpolation unit 32 discussed previously, that is, on the basis of the determination outcome by the edge direction determination unit 28, it appropriately selects four neighboring pixels centered on a pixel of interest that is targeted for interpolation, and creates an interpolated value.

(2)-8 Edge Stabilization Portion 36

FIG. 14 is an illustration depicting an edge stabilization process that is processed by the edge stabilization unit 36 (FIG. 1). According to the determination outcome by the edge direction determination unit 28, the edge stabilization process can take any of three modes on the basis of pixel data subsequent to interpolation. Specifically, in the event of a vertical determination as depicted in (A) of FIG. 14, five green pixel data points G03, G13, G23, G33, and G43 lying in the vertical direction of a green pixel of interest G23 will be used. In the event of a horizontal determination as depicted in (B) of FIG. 14, five green pixel data points G21, G22, G23, G24, and G25 lying in the horizontal direction of the green pixel of interest G23 will be used. In the event of a diagonal or other determination as depicted in (C) of FIG. 14, pixel data from five green pixel data points G13, G22, G23, G24, and G33 surrounding the green pixel of interest G23 will be used. In each of these three modes, the green pixel data G23 will be the average value of three intermediate pixel data points derived by excluding the largest value and the smallest value of the five green pixel data points. The process for red and for blue pixel data will be carried out analogously to that for green pixel data.

(3) Working Effects of the Embodiment

The embodiment described above affords the following working effects in addition to those mentioned above.

(3)-1 In the image capture device herein, pixel data of a pixel of interest and of neighboring pixels is used by the edge direction determination unit 28 to determine the edge direction of a subject; and on the basis of the outcome of this determination, different processes will be carried out in relation to correction in the event that the pixel of interest is a defective pixel. Specifically, in areas lacking specificity of edge direction of the subject, i.e. areas of a pattern lacking an edge and having minimal color variation, a defective pixel can be detected reliably by using a smaller threshold value for determining defective pixels; and on the basis of this detection outcome, appropriate correction can be made to a defective pixel that particularly tends to stand out against a uniform pattern.

(3)-2 In areas in which there is specificity of edge direction of a subject, i.e. areas of a pattern in which an edge is present and having considerable color variation, if correction were performed by the correction unit discussed above, defective pixel determinations would become too numerous, resulting in degraded picture quality. However, because in the image capture unit 10 herein, processing of the pixel of interest through color interpolation will be carried out on the basis of the determination outcome by the edge direction determination unit 28 in a manner irrespective of the defective pixel determination, even if a defective pixel happens to be present in an edge section, it will be possible nevertheless to obtain an image having a sharp edge, while making full use of the pixel data of the pixel of interest.

This invention is not limited to the embodiment set forth hereinabove, and may be reduced to practice in various other modes without departing from the spirit thereof.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. An image capture device adapted to correct a pixel value of a pixel among a plurality of pixels of an image capture unit, the image capture unit making up an image of a subject, comprising:

a pixel data acquisition unit adapted to sequentially acquire a first pixel data that represents a pixel value of a pixel of interest targeted for a defective pixel detection, and a second pixel data that represents pixel values of a plurality of neighboring pixels situated neighboring the pixel of interest;

an edge direction determination unit adapted to make a high-frequency component of the pixel of interest, and to determine whether the pixel of interest, together with neighboring pixels, define a pattern of an edge of the subject in any direction, based on the high-frequency component, wherein the high-frequency component is derived based on differential between the first pixel data and the second pixel data;

a defective pixel determination unit adapted to determine whether the pixel of interest is defective based on the first and second pixel data output by the pixel data acquisition unit;

a correction unit adapted (i) to make a correction value derived from the first pixel data and second pixel data in a symmetrical array centered on the first pixel data, (ii) to determine whether a first and second condition are satisfied, and (iii) to correct the first pixel data based on the correction value when the first and second condition are satisfied, wherein the first condition is that the defective pixel determination unit determines that the pixel of interest is defective, and the second condition is that the edge direction determination unit determines that the pixel of interest does not lie in the pattern of the edge of the subject in any direction, and a color interpolation unit adapted to prepare a third pixel data based on the second pixel data that differs in color from the pixel of interest and is arrayed in the direction of the pattern of the edge determined by the edge direction determination unit, and to interpolate the third pixel data at location of the pixel of interest when the edge direction determination unit determines that the pixel of interest lies in the pattern of the edge of the substrate in any direction.

2. The image capture device in accordance with claim 1 wherein the high-frequency component is derived based on a differential, wherein the differential includes a sum of the second pixels data of identical color to the first pixel data, and a value obtained by multiplying the first pixel data by the number of the neighboring pixels.

3. The image capture device in accordance with claim 1 wherein
the defective pixel determination unit derives determination pixel groups containing the first pixel data and the second pixel data that are arranged in order from larger pixel values thereof; and to determine that the pixel of interest is defective when the first pixel data lies within a prescribed high or low range in the determination pixel group.

4. The image capture device in accordance with claim 3 wherein
the defective pixel determination unit decides that the pixel of interest is defective, when the first pixel data is greater by a prescribed threshold value than a median value of the determination pixel group.

5. The image capture device in accordance with claim 1 wherein
the correction value of the correction unit is based on an average value of pixel values, wherein the average value is obtained by arranging the first pixel data and the second pixel data in order from larger pixel values thereof, and excluding high and low range pixel values.

6. The image capture device in accordance with claim 1 wherein
the edge direction determination unit determines edge direction based on reference value pixel data of the second pixel data centered on the first pixel data, wherein the reference pixel data constitutes pixel data in the vertical direction, pixel data in the horizontal direction, and pixel data in a diagonal direction, and is different in color from the pixel of interest.

7. The image capture device in accordance with claim 6 wherein
the edge direction is determined by deriving respective absolute values of pixel data differential in the vertical direction, horizontal direction, and vertical direction; and deciding that the absolute value is equal to or greater than a prescribed value and represents the smallest direction value.

8. The image capture device in accordance with claim 1 wherein
the third pixel data of the color interpolation unit is based on an average value of pixel values, wherein the average value is obtained by arranging the second pixel data lined up in the edge direction and in order from larger pixel values thereof and excluding high and low range pixel values.

9. An image processing method for an image capture device adapted to correct a pixel value of a pixel among a plurality of pixels of an image capture unit, the image capture unit making up an image of a subject, the method comprising:
sequentially acquiring a first pixel data that represents a pixel value of a pixel of interest targeted for a defective pixel detection, and a second pixel data that represents pixel values of a plurality of neighboring pixels situated neighboring the pixel of interest;
making a high-frequency component of the pixel of interest, and to determine whether the pixel of interest, together with neighboring pixels, define a pattern of an edge of the subject in any direction, based on the high-frequency component, wherein the high-frequency component is derived based on differential between the first pixel data and the second pixel data;
determining whether the pixel of interest is defective based on the first and second pixel data;
making a correction value derived from the first pixel data and the second pixel data in a symmetrical array centered on the first pixel data,
determining whether a first and second condition are satisfied, wherein the first condition is based on determination that the pixel of interest is defective, and the second condition is based on determination that the pixel of interest does not lie in the pattern of the edge of the subject in any direction,
correcting the first pixel data based on the correction value when the first and second condition are satisfied, and
preparing a third pixel data based on the second pixel data that differs in color from the first pixel data and is arrayed in the direction of the pattern of the edge determined, and
interpolating the third pixel data at location of the pixel of interest based on determination that the pixel of interest lies in the pattern of the edge of the substrate in any direction.

10. The method in accordance with claim 9 wherein
the high-frequency component is derived based on a differential, wherein the differential includes a sum of the second pixels data of identical color to the first pixel data, and a value obtained by multiplying the first pixel data by the number of the neighboring pixels.

11. The method in accordance with claim 9, further comprising
making determination pixel groups containing the first pixel data and the second pixel data that are arranged in order from larger pixel values thereof; and to determine that the first pixel data is defective when the first pixel data lies within a prescribed high or low range in the determination pixel group.

12. The method in accordance with claim 11, further comprising
deciding that the first pixel data is defective, when the first pixel data is greater by a prescribed threshold value than a median value of the determination pixel group.

13. The method in accordance with claim 9, further comprising
making an average value of pixel values, wherein the average value is obtained by arranging the first pixel data and the second pixel data in order from larger pixel values thereof, and excluding high and low range pixel values.

14. The method in accordance with claim 9 wherein
the edge direction is based on reference value pixel data of the second pixel data centered on the first pixel data, wherein the reference pixel data constitutes pixel data in the vertical direction, pixel data in the horizontal direction, and pixel data in a diagonal direction, and is different in color from the pixel of interest.

15. The method in accordance with claim 14 wherein
the edge direction is determined by deriving respective absolute values of pixel data differential in the vertical direction, horizontal direction, and vertical direction; and deciding that the absolute value is equal to or greater than a prescribed value and represents the smallest direction value.

16. The method in accordance with claim 9 wherein
the third pixel data is based on an average value of pixel values, wherein the average value is obtained by arranging the second pixel data lined up in the edge direction and in order from larger pixel values thereof and excluding high and low range pixel values.

* * * * *